United States Patent [19]
Kikuchi et al.

[11] Patent Number: 5,917,685
[45] Date of Patent: Jun. 29, 1999

[54] SHUTTER GUIDE PLATE ASSEMBLY FOR DISC CARTRIDGE

[75] Inventors: Shuichi Kikuchi; Takatsugu Funawatari, both of Miyagi, Japan

[73] Assignee: Sony Corporation, Tokyo, Japan

[21] Appl. No.: 08/955,435

[22] Filed: Oct. 21, 1997

[30] Foreign Application Priority Data

Oct. 23, 1996 [JP] Japan .................................. 8-279754

[51] Int. Cl.$^6$ .............................................. G11B 23/03
[52] U.S. Cl. ........................................................... 360/133
[58] Field of Search .................... 360/132, 133, 360/135

[56] References Cited

U.S. PATENT DOCUMENTS

5,161,080  11/1992  Funayama et al. ..................... 360/133
5,166,922  11/1992  Akiyama et al. ................... 360/133 X
5,799,009   8/1998  Takahashi et al. ..................... 360/133

*Primary Examiner*—John H. Wolff
*Attorney, Agent, or Firm*—Frommer Lawrence & Haug, LLP; William S. Frommer

[57] ABSTRACT

A disk cartridge includes a cartridge main body with a shutter-guide-plate mount, a shutter slidably mounted to the cartridge main body, a shutter guide plate mounted to the shutter-guide-plate mount to guide sliding of a pointed end of the shutter, and an adhesive placed between the shutter-guide-plate mount and the shutter guide plate. The adhesive is 10% or less in volume difference between the melted and solidified states.

12 Claims, 11 Drawing Sheets

SHUTTER GUIDE PLATE ASSEMBLY FOR DISC CARTRIDGE

BACKGROUND OF THE INVENTION

The present invention relates to disk cartridges wherein a recording/reproducing and spindle-insertion openings are opened/closed by a shutter slidably mounted thereto.

Figure 19:
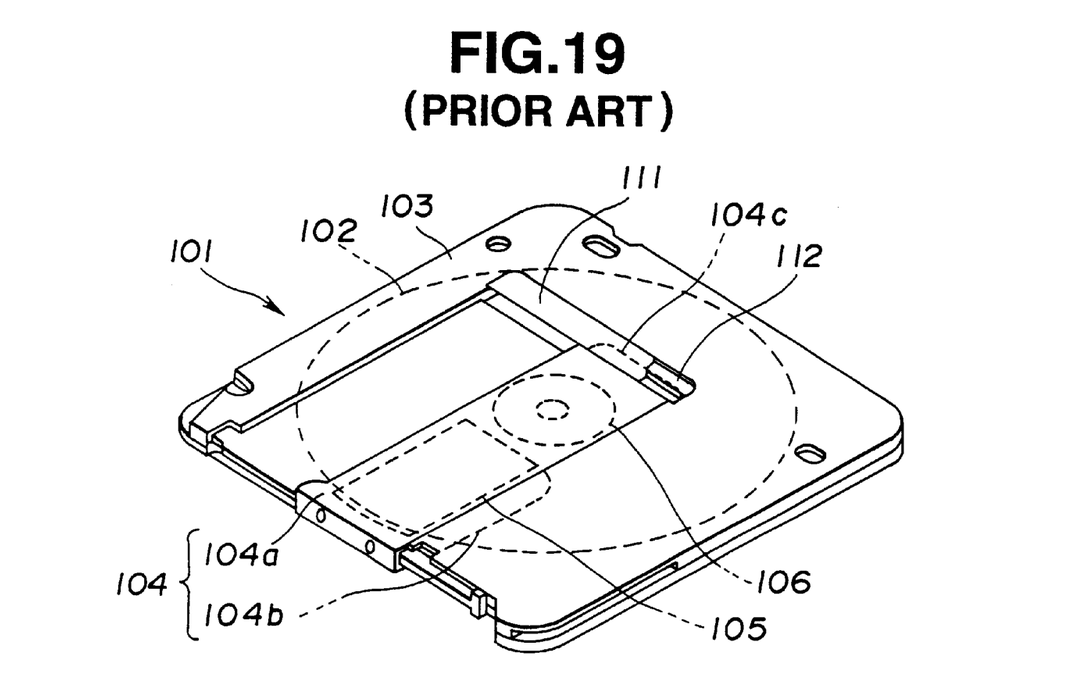
FIG. 19 is a view similar to FIG. 14, showing a known disk cartridge.

Referring to FIG. 19, a known disk cartridge 101 comprises a disk or disklike recording means 102 such as an optical disk or magneto-optical disk, a main body 103 for rotatably accommodating the disk 102, and a shutter 104 slidably mounted to the main body 103. Recording/reproducing and spindle-insertion openings 105, 106 are formed in one side (upper side as viewed in FIG. 19) of the cartridge main body 103, and a recording/reproducing opening 105 is formed in another side (lower side as viewed in FIG. 19) thereof.

The shutter 104, which serves to open/close the recording/reproducing and spindle-insertion openings 105, 106 of the cartridge main body 103, is formed, e.g. by bending a metal plate in a C-shape. The shutter 104 is slidably mounted to the cartridge main body 103 so as to hold it by a pair of shutter plates 104a, 104b. The shutter plate 104a serves to open/close the recording/reproducing and spindle-insertion openings 105, 106 formed in one side of the cartridge main body 103, whereas the shutter plate 104b serves to open/close the recording/reproducing opening 105 formed in another side thereof.

Since the shutter 104 is formed, e.g. by bending a metal plate in a C-shape, the shutter plates 104a, 104b have a pointed or free end which is warped easily. Particularly, the shutter plate 104a, which needs to open/close both the recording/reproducing and spindle-insertion openings 105, 106, is greater in length than the shutter plate 104b, it is warped more easily. The shutter plate 104b, which only needs to open/close the recording/reproducing opening 105, may be smaller in length.

A shutter guide plate 111 is arranged to prevent a warp of the pointed end of the shutter plate 104a of the shutter 104 and to slide the shutter 104 smoothly. The shutter guide plate 111 is mounted to a shutter-guide-plate mount 112 of the cartridge main body 103, and holds the upper side of a bend 104c of the shutter plate 104a formed at the pointed end thereof to prevent a warp thereof.

Figure 20:
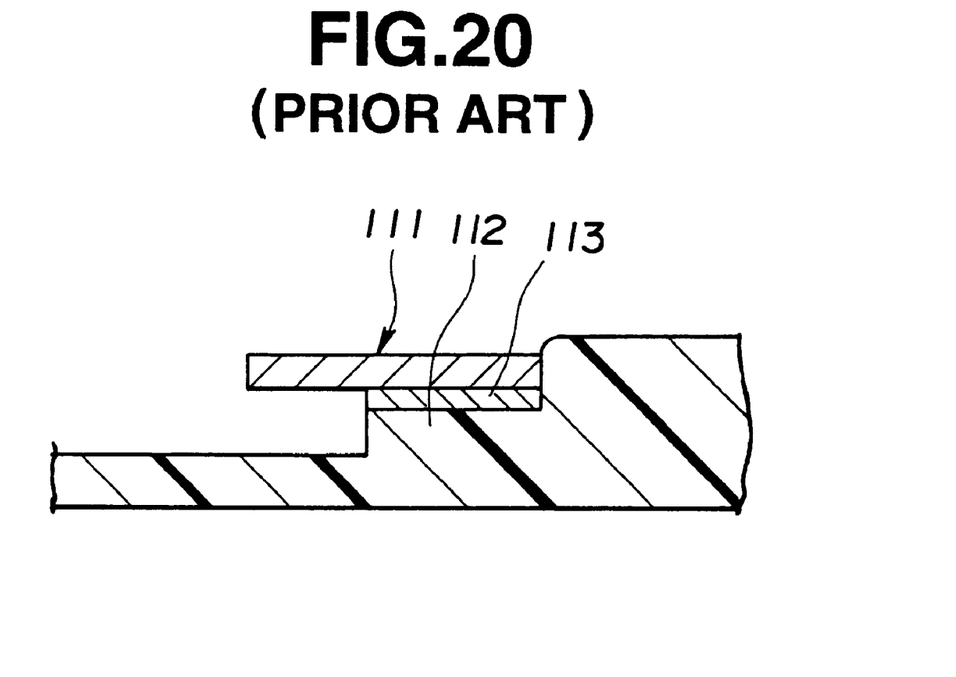
FIG. 20 is a view similar to FIG. 13, showing the shutter guide plate.
Figure 21:
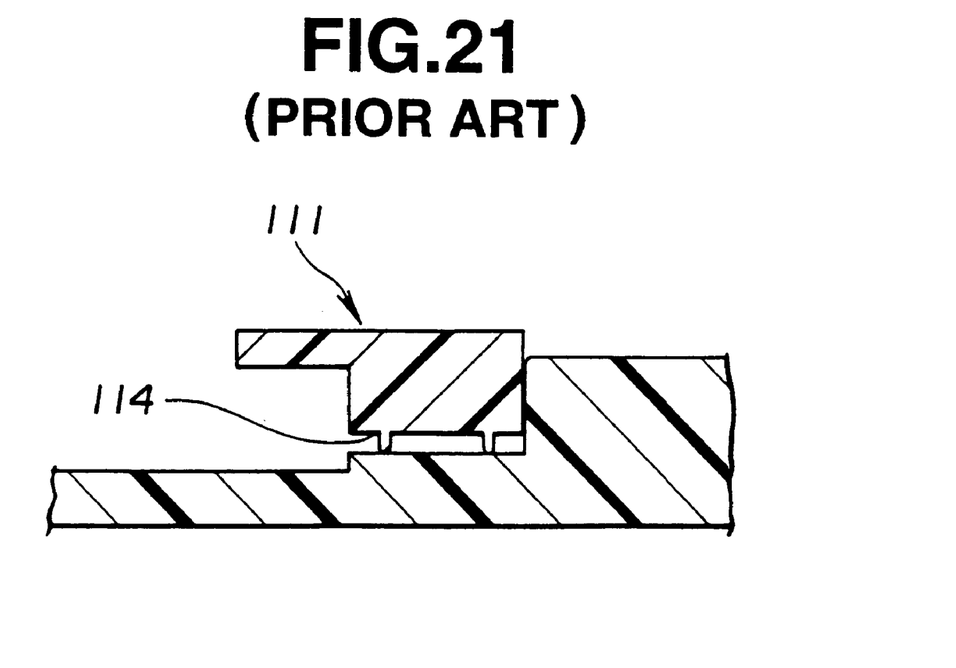
FIG. 21 is a view similar to FIG. 13, showing the shutter guide plate with welded ribs.

The shutter guide plate 111 is made of metal or synthetic resin. Referring to FIG. 20, mounting of the metallic shutter guide plate 111 to the shutter-guide-plate mount 112 is generally carried out in accordance with the method using an adhesive double coated tape 113. Referring to FIG. 21, mounting of the resin shutter guide plate 111 to the shutter-guide-plate mount 112 is generally carried out in accordance with the welding method wherein welded ribs 114 arranged to the shutter guide plate 111 are melted by supersonic vibrations, then solidified.

The known disk cartridge 101 produces the following inconveniences:

First, the method of mounting the metallic shutter guide plate 111 to the shutter-guide-plate mount 112 by the adhesive double coated tape 113 is not excellent in welding efficiency, and causes a cost increase of the disk cartridge 101 due to relatively higher cost of the tape 113.

Second, with the disk cartridge 101 having the resin shutter guide plate 111 mounted to the shutter-guide-plate mount 112 by welded resin, the resin shutter guide plate 111 is broken more easily than the metallic one, and the cartridge main body 103 easily produces a distortion upon welding.

The above inconveniences can be solved by mounting the metallic shutter guide plate 111 to the shutter-guide-plate mount 112 by an adhesive, which may cause, however, a deformation of the shutter guide plate 111 and the cartridge main body 103 due to contraction distortion of the adhesive produced upon curing thereof.

It is, therefore, an object of the present invention to provide disk cartridges which are free of a distortion and deformation produced therein upon mounting, and are excellent in working efficiency and cost performance.

SUMMARY OF THE INVENTION

According to one aspect of the present invention, there is provided a cartridge for a disk, comprising:

a main body rotatably accommodating the disk, said main body including a site;

a shutter slidably mounted to the main body;

a guide plate mounted to said site of said main body, said guide plate serving to guide sliding of a pointed end of said shutter; and an adhesive placed between said site of said main body and said guide plate, said adhesive being 10% or less in volume difference between melted and solidified states.

Another aspect of the present invention lies in providing a cartridge for a disk, comprising:

a main body rotatably accommodating the disk, said main body including a site;

a shutter slidably mounted to the main body;

a guide plate mounted to said site of said main body, said guide plate serving to guide sliding of a pointed end of said shutter; and means for joining said guide plate to said site of said main body, said joining means being 10% or less in volume difference between melted and solidified states.

DETAILED DESCRIPTION OF THE INVENTION

Figure 1:
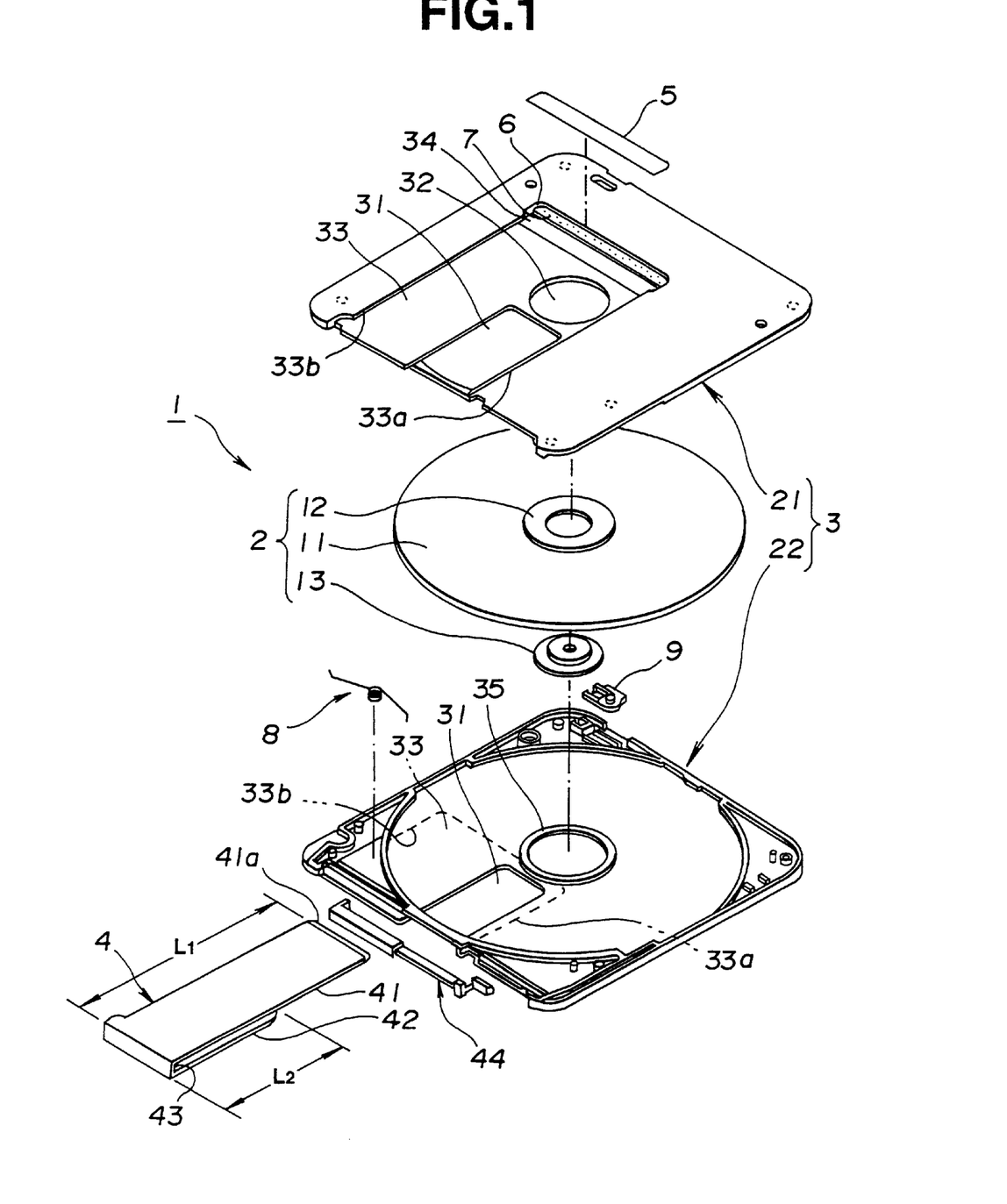
FIG. 1 is an exploded perspective view showing a disk cartridge embodying the present invention.
Figure 2:
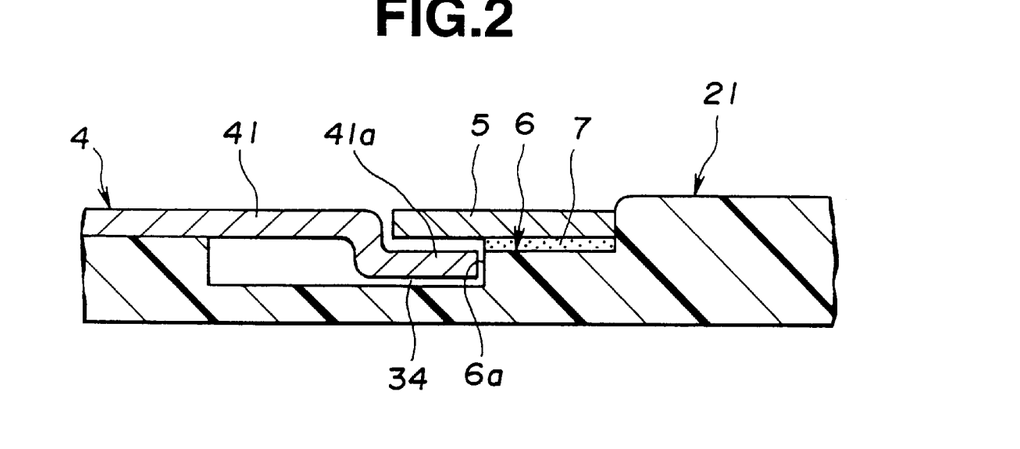
FIG. 2 is a fragmentary section showing an upper half of a cartridge main body with a shutter guide plate.

Referring to FIG. 1, a disk cartridge 1 comprises a disk 2, a main body or shell 3 for rotatably accommodating the disk 2, a shutter 4 slidably mounted to the main body 3, and a shutter guide plate 5 for guiding slide movement of a pointed end of the shutter 4. The shutter guide plate 5 is mounted to a shutter-guide-plate mount 6 of a cartridge main body 3 by an adhesive 7. Referring to FIG. 2, the shutter guide plate 5 has an eaved portion which protrudes from one side 6a of the shutter-guide-plate mount 6 to hold the upper side of the pointed end of the shutter 4, obtaining prevented warp and smooth sliding thereof. In FIG. 1, reference numeral 8 designates a spring for maintaining the shutter 4 in the closed state, and 9 designates an anti error-erasing member slidably mounted to the lower half 22.

Next, the component parts will be described in detail. Referring to FIG. 1, the disk 2 comprises a magneto-optical disk main body 11, and metallic upper and lower hubs 12, 13 mounted on the upper and lower side of the main body 11 in the center thereof.

The cartridge main body 3 includes upper and lower halves 21, 22. The upper half 21 has a disk-drive-shaft insertion opening 32 formed in the center, and a recording/reproducing opening 31 placed beside the opening 32. The upper hub 12 of the disk 2 faces the disk-drive-shaft insertion opening 32, and a recording area of the disk main body 11 faces the recording/reproducing opening 31. The upper half 21 has a shutter-mounting recess or shutter-sliding area 33 formed in the outer side or upper side as viewed in FIG. 1. When pressing the shutter 4 on one side 33a of the shutter-mounting recess 33, the recording/reproducing opening 31 and the disk-drive-shaft insertion opening 32 are closed by the shutter 4. On the other hand, when pressing the shutter 4 on another side 33b of the shutter-mounting recess 33, the openings 31, 32 are opened.

Arranged at the inner end of the shutter-mounting recess 33 are a groove or shutter-free-end receiving portion 34 for receiving a bend of the shutter 4 formed at the pointed end thereof as will be described later, and the shutter-guide-plate mount 6.

The lower half 22 has an annular rib or protrusion 35 formed in the center of the inner side or upper side as viewed in FIG. 1, and the recording/reproducing opening 31 placed beside the annular rib 35. The lower hub 13 of the disk 2 faces the annular rib 35, and the recording area of the disk main body 11 faces the recording/reproducing opening 31. The lower half 22 has a shutter-mounting recess or shutter-sliding area 33 formed in the outer side or lower side as viewed in FIG. 1. When pressing the shutter 4 on one side 33a of the shutter-mounting recess 33, the recording/reproducing opening 31 is closed by the shutter 4. On the other hand, when pressing the shutter 4 on another side 33b of the shutter-mounting recess 33, the opening 31 is opened. The shutter 4 is mounted to the cartridge main body 3 so as to cover the shutter-mounting recesses 33 of the upper and lower halves 21, 22.

The shutter 4 is formed like a C-shape by upper and lower shutter plates or movable opening cover 41, 42 arranged on the shutter-mounting recesses 33 of the upper and lower halves 21, 22, and connection 43 for connecting the shutter plates 41, 42 at one end thereof. A slide member 44 is mounted to the connection 33 in the inner side thereof, and has legs inserted and held in a slide guide groove of the upper and lower halves 21, 22, obtaining the shutter 4 slidably mounted to the cartridge main body 3 at the front end thereof.

The shutter plate 41 has a length $L_1$ which enables closing of both the recording/reproducing opening 31 and the disk-drive-shaft insertion opening 32 formed in the upper half 21, whereas the shutter plate 42 has a length $L_2$ which enables closing of the recording/reproducing opening 31 formed in the lower half 22.

The shutter plate 41 has a pointed end 41a bent stepwise and inserted in the groove 34 of the upper half 21 as shown in FIG. 2. The upper side of the pointed end 41a is held by the shutter guide plate 5, which prevents a detachment of the pointed end 41a from the upper half 21 due to warp thereof.

The shutter guide plate 5 is obtained by cutting in a predetermined shape a plate of synthetic resin such as polycarbonate or acrylonitrile butadien styrene (ABS) of 0.3–0.8 mm thickness, a plate of stainless steel (SUS304) or aluminum of 0.1–0.5 mm thickness, or a plate of the above synthetic resin laminated with aluminum foil, etc. As described above, the shutter guide plate 5 is joined to the shutter-guide-plate mount 6 of the upper half by the adhesive 7.

The adhesive 7 is of the two-epoxy-agent type, the solventless hot-melt type, or the ultraviolet-curing type containing acrylic oligomer, etc., with 10% or less volume difference between the melted and solidified states.

Figure 3:
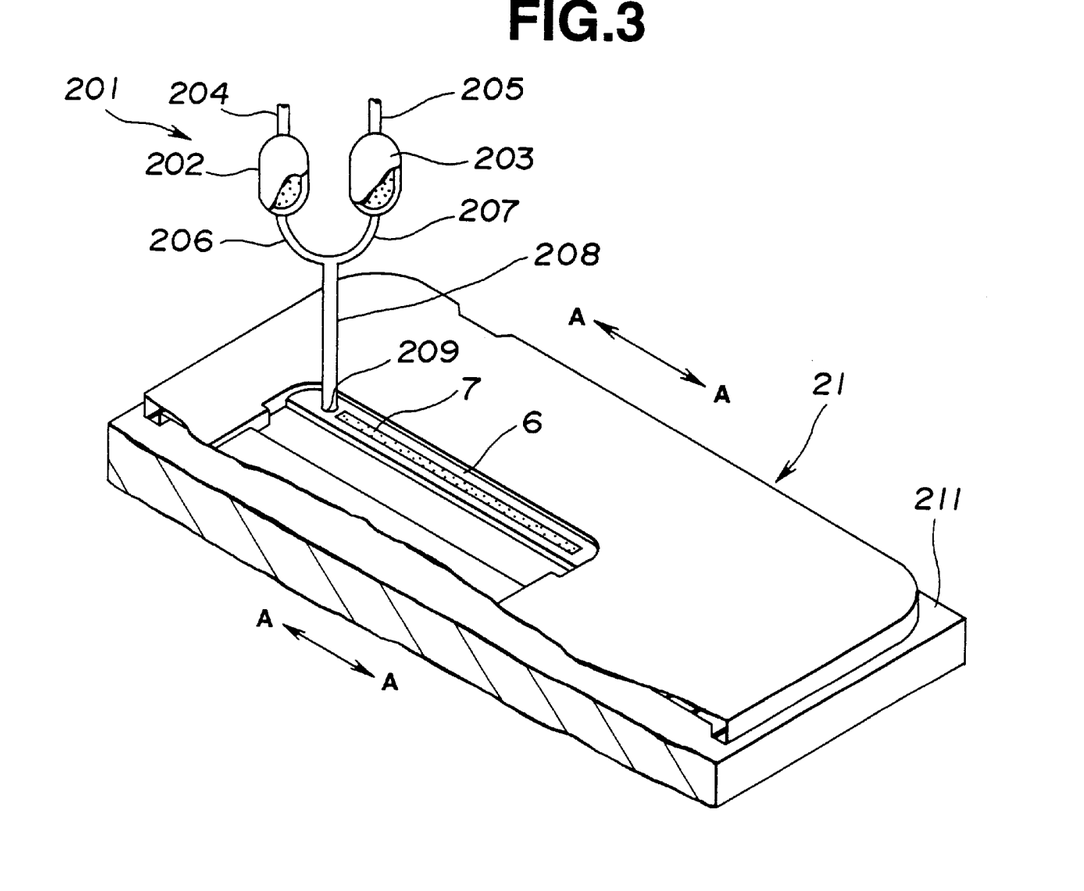
FIG. 3 is a perspective view showing an adhesive placing device.

FIG. 3 shows an example of the method of placing the adhesive 7 of the two-epoxy-agent type on the shutter-guide-plate mount 6 by the placing device 201. The placing device 201 comprises a main tank 202 for holding a main agent of the adhesive 7, and an auxiliary tank 203 for holding an auxiliary or curing agent. Compressed air is introduced in the tanks 202, 203 through air tubes 204, 205 to press out the main and curing agents from delivery tubes 206, 207, which are introduced and stirred in a tube 208 connected to the delivery tubes 206, 207, then placed on the shutter-guide-plate mount 6 through a nozzle 209 mounted to the tube 208 at the pointed end thereof. The upper half 21 having the shutter-guide-plate mount 6 is disposed on a workbench 211. Movement of the workbench 211 or the placing device 201 in the direction of arrows A—A allows stripe-like placing of the adhesive 7 on the shutter-guide-plate mount 6.

The shutter-guide plate 5 is pressed on the adhesive 7 to cure and solidify it, and is thus fixed to the shutter-guide-plate mount 6. The volume difference of the adhesive 7 between the melted and solidified states is within 10%, so that when placing the adhesive 7 of relatively great thickness, e.g. 50 μm or more, a contraction distortion of the adhesive 7 produced upon solidification thereof is small enough to avoid a deformation of the shutter guide plate 5 and the upper half 21, enabling preservation of smooth sliding of the shutter 4.

Figure 4:
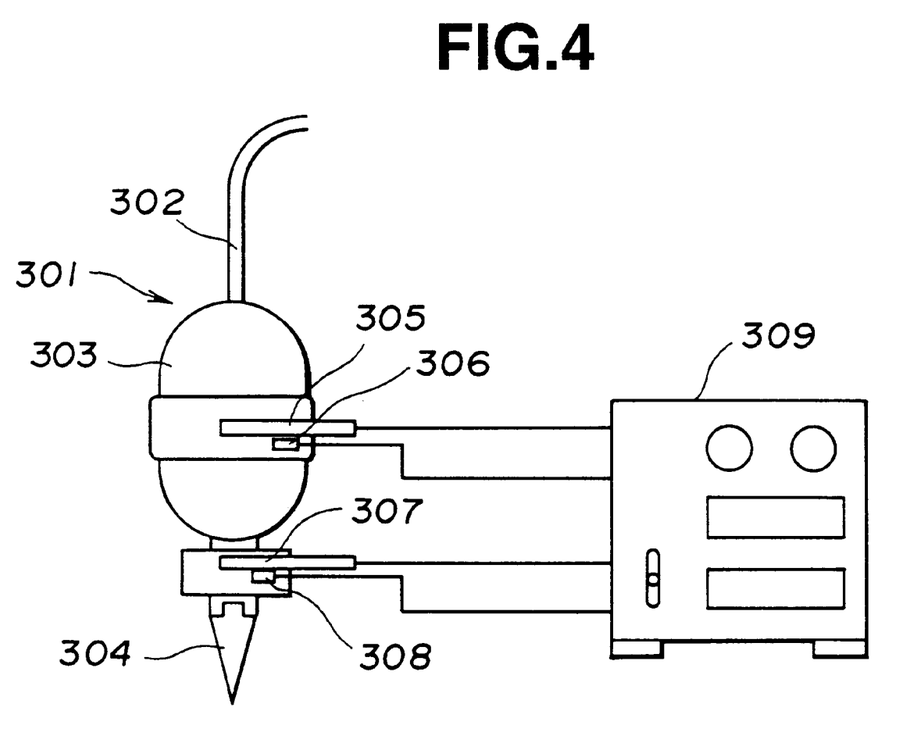
FIG. 4 is a side view showing the adhesive placing device.

FIG. 4 shows an example of the method of placing the adhesive 7 of the hot-melt type on the shutter-guide-plate mount 6 by a placing device 301. The placing device 301 comprises an adhesive tank 303 for holding the adhesive 7 and providing it by compressed air introduced through an air pipe 302, and a nozzle 304 for placing the adhesive 7 on the shutter-guide-plate mount 6. Arranged to the adhesive tank 303 are a first heater 305 and a temperature sensor 306, whereas arranged to the nozzle 304 are a second heater 307 and a temperature sensor 308. The first and second heaters 305, 307 and the temperature sensors 306, 308 are controlled by a controller 309. The adhesive 7 is kept low in temperature in the tank 303, and is heated to a predetermined temperature by the second heater 307 immediately before discharged from the nozzle 304, e.g. immediately before placed, restraining a quality deterioration thereof.

The adhesive 7 of the hot-melt type produces less choking of the nozzle 304 than the adhesive of the two-epoxy-agent type, resulting in an improvement in the placing efficiency and the maintenance performance.

As described above, in the heated and melted state, the adhesive 7 of the hot-melt type is placed on the shutter-guide-plate mount 6. When pressing the shutter guide plate 5 on the adhesive 7, it is cooled suddenly with heat absorbed by the shutter guide plate 5, producing a skinning so called on the surface of the adhesive 7, lowering the adhesive strength. A lowering of the adhesive strength due to skinning is effectively prevented by preheating the shutter guide plate 5.

Figure 5:
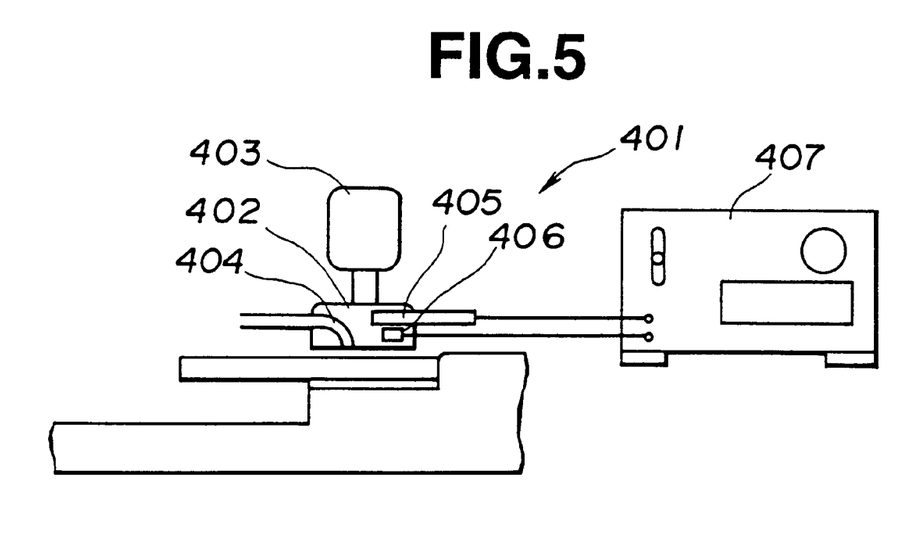
FIG. 5 is a view similar to FIG. 4, showing a shutter-guide-plate pickup device.

FIG. 5 shows a case where the shutter guide plate 5 is heated by a shutter-guide-plate pickup device 401 for carrying the shutter guide plate 5 on the shutter-guide-plate mount 6 and pressing it on the adhesive 7 of the hot-melt type.

The pickup device 401 comprises a shutter-guide-plate support 402, and an air cylinder 403 for vertically moving the shutter-guide-plate support 402. Arranged to the shutter-guide-plate support 402 are an absorber 404 for absorbing the shutter guide plate 5 by vacuum, a heater 405 for heating the shutter guide plate 5 absorbed by the absorber 404, and a temperature sensor 406. The heater 405 and the temperature sensor 406 are controlled by a controller 407.

When carrying the shutter guide plate 5 by the pickup device 401, the shutter guide plate 5 is heated by the heater 405 to a predetermined temperature, e.g. a melting temperature of the adhesive 7, and it is then pressed on the adhesive 7 by the air cylinder 403. This prevents a sudden temperature fall of the adhesive 7, having no skinning on the surface thereof, ensuring sufficient effect of the adhesive 7.

Figure 6:
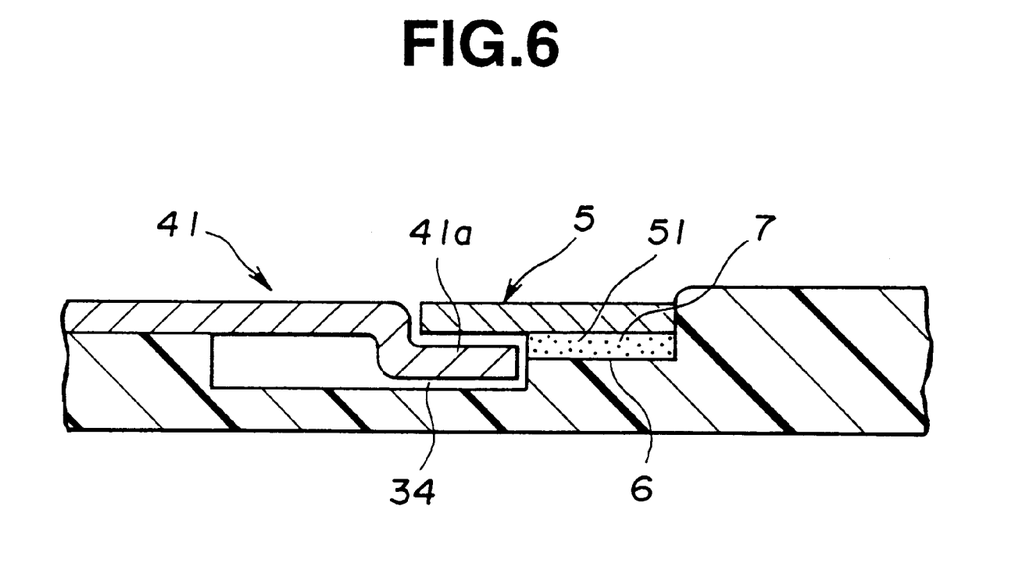
FIG. 6 is a view similar to FIG. 2, showing the upper half of the cartridge main body.

FIG. 6 shows a case where a filler 51 of inorganic material such as calcium carbonate is mixed in the adhesive 7 of, e.g. the hot-melt type to improve the shear strength, heat resistance, and cohesive strength thereof. The filler 51 is 3–20 μm in size, and is mixed in the adhesive 7 at the rate of 2–25% by weight.

The reason why the size of the filler 51 is determined to 3–20 μm is as follows. With 3 μm or less, the filler 51 is not uniformly dispersed in the adhesive 7, whereas with 20 μm or more, the filler 51 cannot be discharged smoothly without enlarging the diameter of the nozzle, or the discharge of the adhesive 7 from the nozzle cannot be controlled easily when very thin placing the adhesive 7 on the shutter-guide-plate mount 6.

The reason why the quantity of the filler 51 mixed is 2–25% by weight is as follows. With 2% or less by weight, a desired cohesive strength of the adhesive 7 cannot be obtained, whereas with 25% or more by weight, the filler 51 mixed precipitates in the tank, resulting in difficulty of securing the uniformity thereof.

Figure 7A:
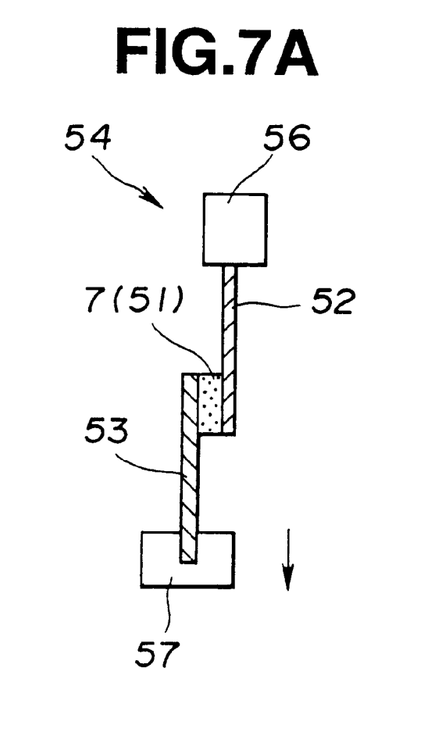
FIG. 7A is a diagrammatic view, partly in section, showing a test piece with an adhesive containing a filler.
Figure 7B:
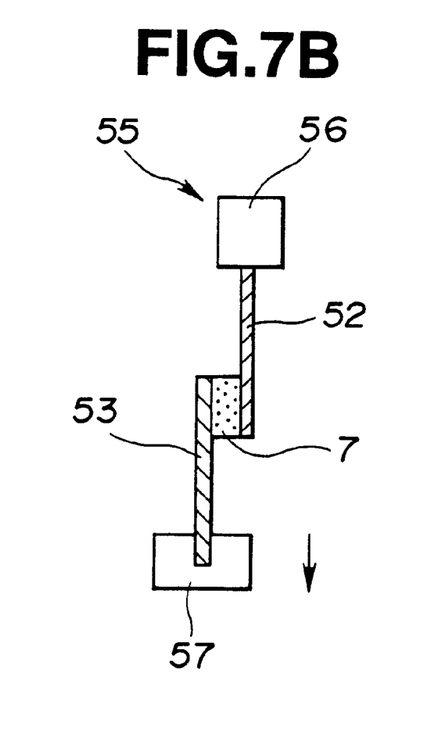
FIG. 7B is a view similar to FIG. 7A, showing a test piece with an adhesive without containing the filler.
Figure 8:
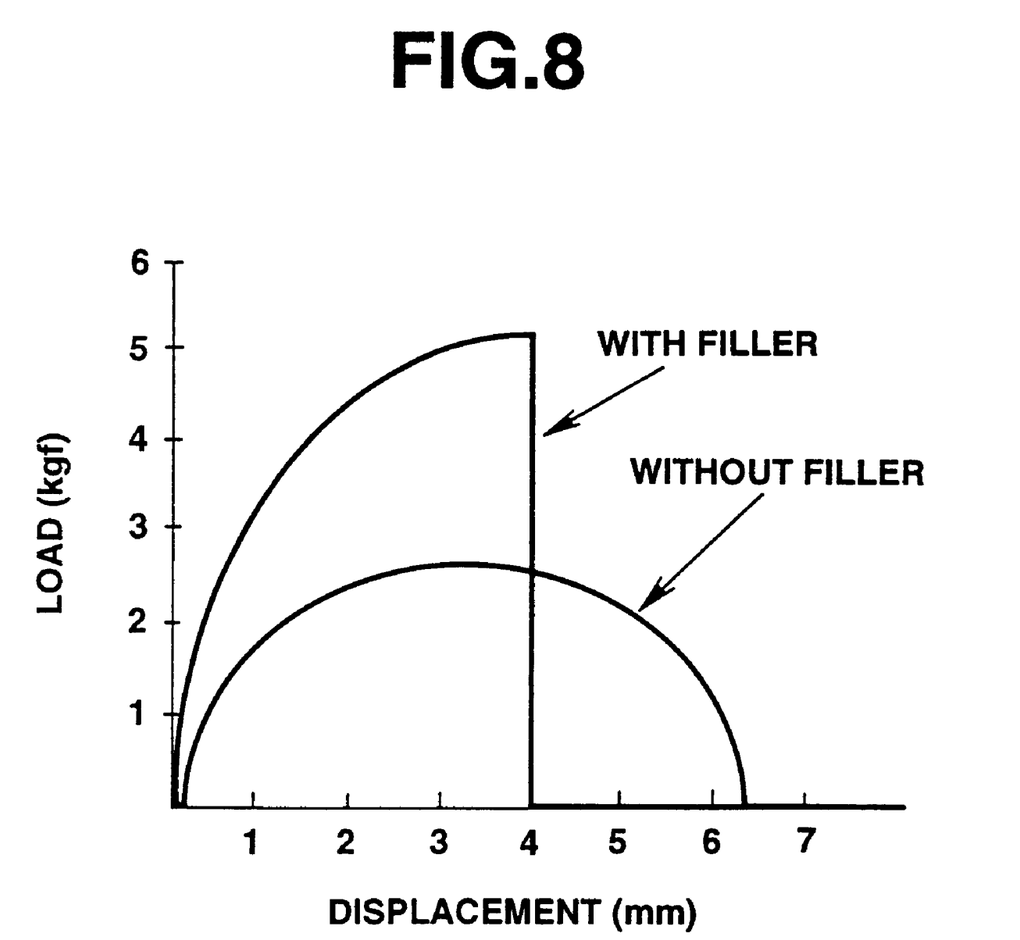
FIG. 8 is a graph showing the results of measurement of the shear strength of the test pieces.

Referring to FIGS. 7A–7B, a comparison of the shear strength of the adhesive 7 is carried out with regard to a test piece 54 shown in FIG. 7A and obtained by joining a stainless-steel plate 52 of the same material as the shutter 4 and a polycarbonate plate 53 of the same material as the upper half 21 by the adhesive 7 containing the filler 51, and a test piece 55 shown in FIG. 7B and obtained by joining the stainless steel 52 and the polycarbonate plate 53 by the adhesive 7 without containing the filler 51. The shear strength of the adhesive 7 is measured by fixing stainless-steel plate 52 to a stationary member 56, and drawing the polycarbonate plate 53 by a loading member 57. Referring to FIG. 8, the results of measurement reveal that the shear strength of the adhesive 7 containing the filler 51 is twice as large as that of the adhesive 7 without containing the filler 51.

Figure 9:
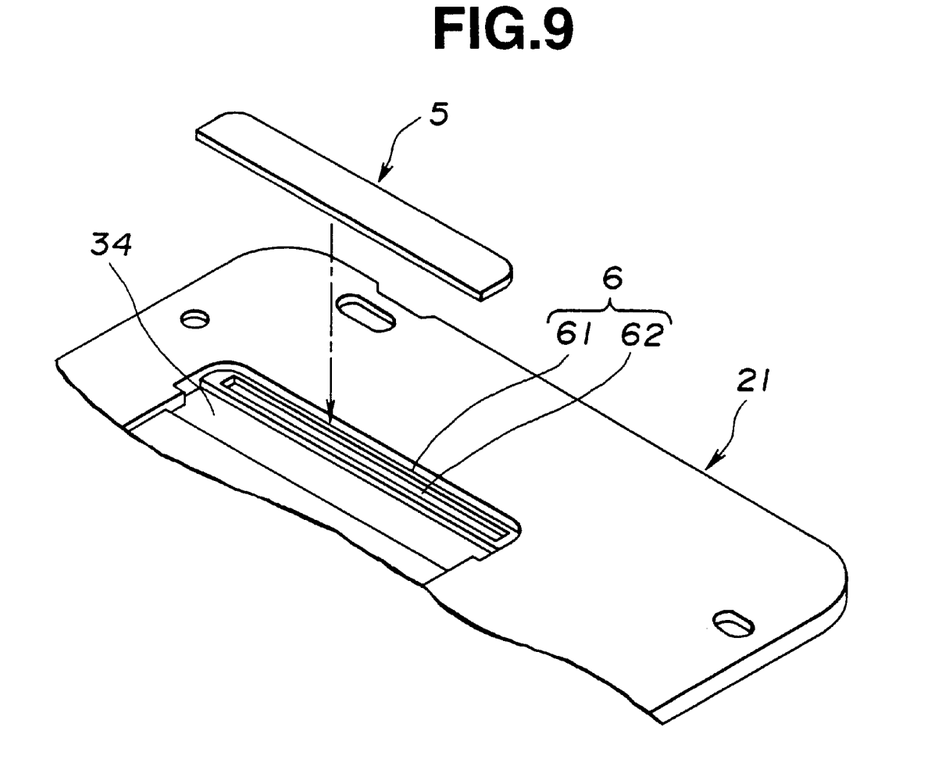
FIG. 9 is a view similar to FIG. 3, showing a first variant of a shutter-guide-plate mount.

FIG. 9 shows a first variant of the shutter-guide-plate mount 6 wherein the shutter-guide-plate mount 6 has a reference surface 61 for disposing the shutter guide plate 5, and a placing surface 62 arranged lower than the reference surface 61 for placing the adhesive 7. The placing surface 62 is arranged in the center of the upper side of the shutter-guide-plate mount 6, whereas the reference surface 61 is arranged to enclose the placing surface 62.

Figure 10:
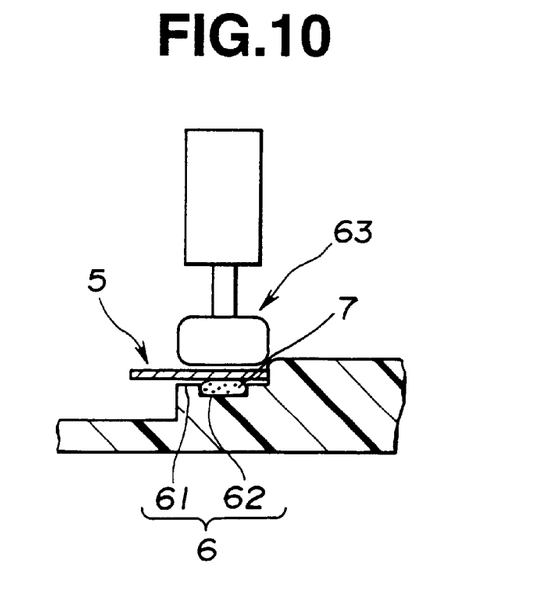
FIG. 10 is a view similar to FIG. 7B, showing the first variant.

Referring to FIG. 10, when placing the adhesive 7 on the placing surface 62, and pressing thereon the shutter guide plate 5 by a predetermined means such as an air cylinder 63, the shutter guide plate 5 is positioned by the reference surface 61 by contacting it, and is mounted to the shutter-guide-plate mount 6 by the adhesive 7.

Figure 11:
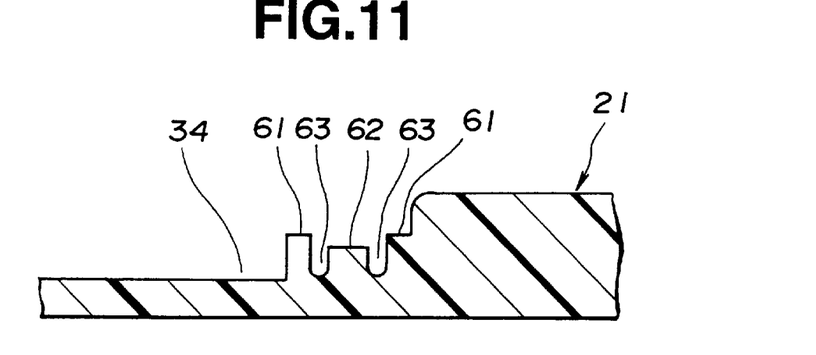
FIG. 11 is a view similar to FIG. 6, showing a second variant of the shutter-guide-plate mount.
Figure 12:
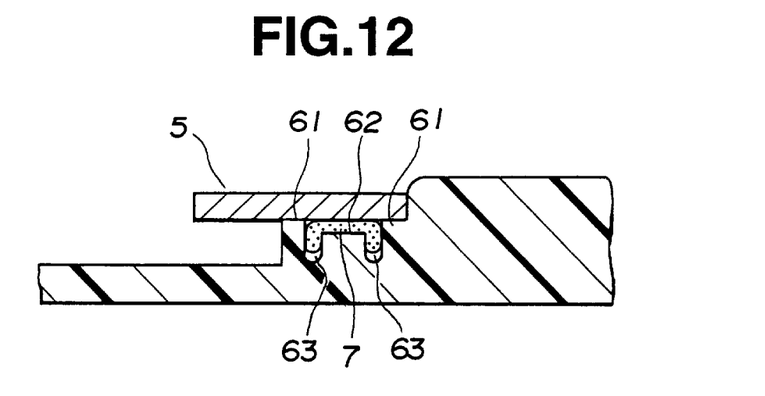
FIG. 12 is a view similar to FIG. 11, showing the shutter-guide-plate mount of FIG. 11 with the shutter guide plate.

FIG. 11 shows a second variant of the shutter-guide-plate mount 6 wherein the grooves 63 for preventing an outflow of the adhesive 7 are formed between the reference surface 61 and the placing surface 62. Therefore, referring to FIG. 12, when placing the adhesive 7 on the placing surface 62, and pressing thereon the shutter guide plate 5, the excess adhesive 7 flows into the grooves 63, resulting in prevented outflow thereof to the reference surface 61.

Figure 13:
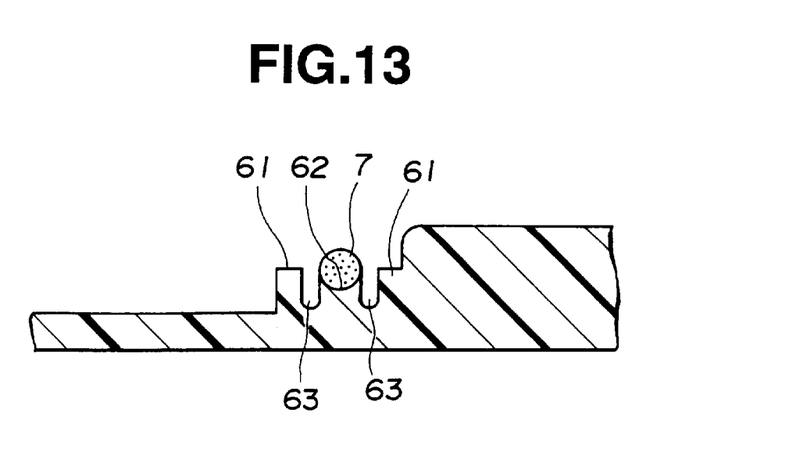
FIG. 13 is a view similar to FIG. 12, showing a third variant of the shutter-guide-plate mount.

FIG. 13 shows a third variant of the shutter-guide-plate mount 6 wherein the bottom of the placing surface 62 is concaved to obtain easy accumulation of the adhesive 7. This serves not only to prevent the adhesive 7 from easily flowing out to the grooves 63 when placed on the placing surface 62, but to improve the adhesion effect due to thickened layer of the adhesive 7.

Figure 14:
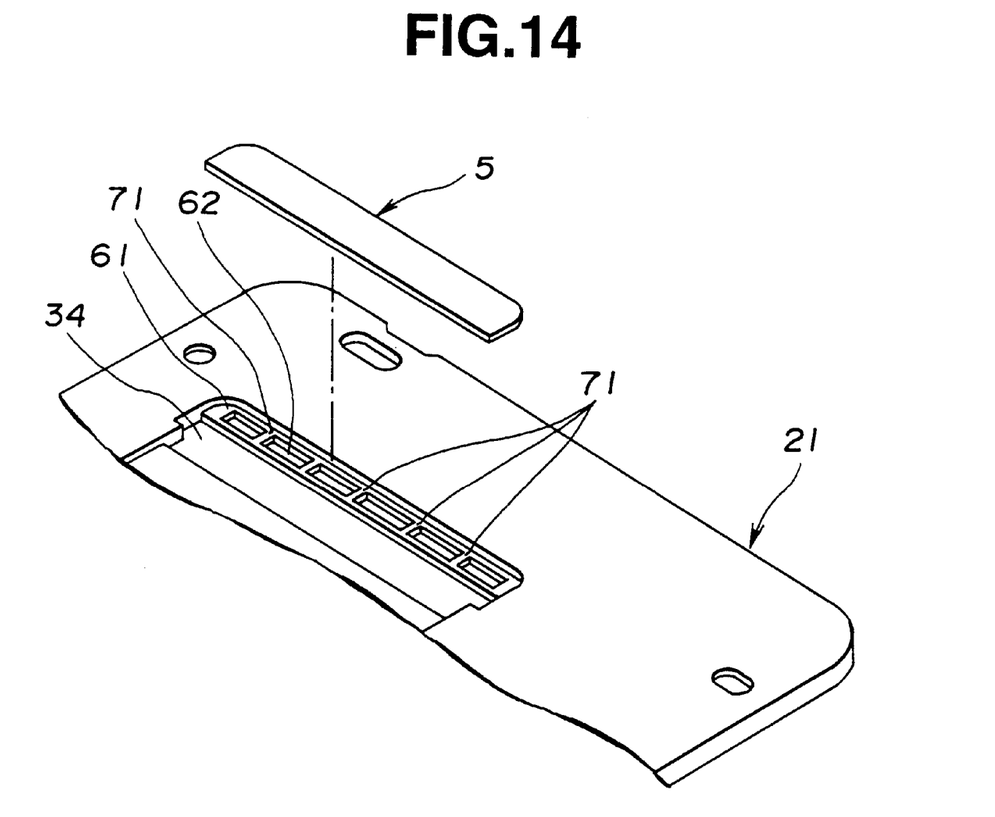
FIG. 14 is a view similar to FIG. 9, showing a fourth variant of the shutter-guide-plate mount.

FIG. 14 shows a fourth variant of the shutter-guide-plate mount 6 wherein ribs 71 of substantially the same height as that of the reference surface 61 are arranged on the placing surface 62.

The ribs 71 serve to support the shutter guide plate 5 from the lower side thereof when joined, preventing a downward bend and deformation thereof.

FIGS. 15A–18 show a fifth variant of the shutter-guide-plate mount 6 wherein a joining surface 5a of the shutter guide plate 5 to be joined to the shutter-guide-plate mount 6 includes a roughened surface to improve a placing of the adhesive 7, thus improving the adhesion reliability. If the joining surface 5a of the shutter guide plate 5 includes a smooth surface, the adhesive 7 is badly placed thereon, and comes off easily when cured. For maintaining the adhesive strength of the adhesive 7 placed on the above smooth surface over a long period of time, a kind of the adhesive 7 and adhesion conditions need to be determined strictly, resulting in a lowering of the productivity and yield of the shutter guide plate 5. This variant solves the above drawback by forming the joining surface 5a of the shutter guide plate 5 in a roughened surface by embossing finish, etc.

Figure 15A:
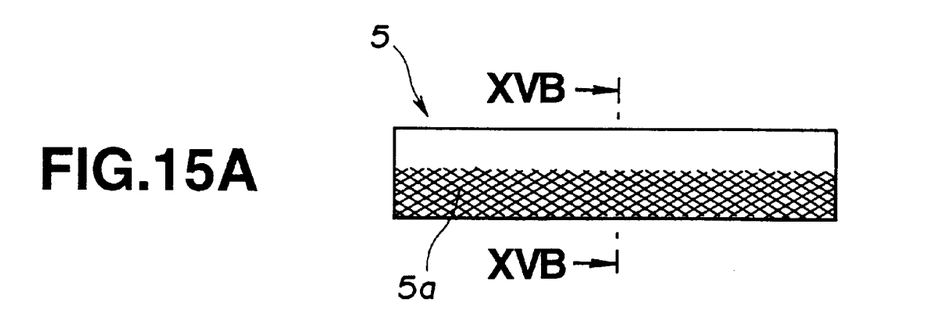
FIG. 15A is a plan view showing a variant of the shutter guide plate.
Figure 15B:
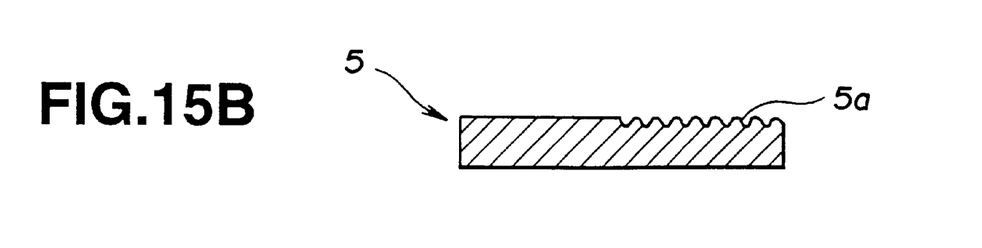
FIG. 15B is a cross section taken along the line XVB—XVB in FIG. 15A.

FIGS. 15A–15B show the shutter guide plate 5 having the joining surface 5a formed in a roughened surface by embossing finish. The shutter guide plate 5 is obtained by cutting in a predetermined shape a plate of synthetic resin such as polycarbonate or ABS of 0.3–0.8 mm thickness, a plate of stainless steel (SUS304) or aluminum of 0.1–0.5 mm thickness, or a plate of the above synthetic resin laminated with aluminum foil, etc. When cutting the plate, the joining surface 5a undergoes embossing finish to obtain a roughened surface. Embossing finish can easily be carried out by a shutter-guide-plate cutting die partly having embossing.

A concrete example of embossing finish will be described with regard to the shutter guide plate 5 of aluminum. Embossing finish is carried out, preferably, with roughness of 5 $\mu$m or more and 30% or less of the plate thickness. It is noted that the roughness is represented by a 10-points means roughness (Rz).

With embossing roughness of 30% of the plate thickness which is, e.g. 0.2 mm, a value of the embossing roughness is 0.2×0.30=0.06 mm (60 $\mu$m). At that time, if the embossing roughness is 5 $\mu$m or less, it is difficult to secure the intimacy/placing of the adhesive 7 with/on the joining surface 5a of the shutter guide plate 5.

With embossing roughness of more than 30% of the plate thickness, the shutter guide plate 5 may be deformed in its entirety, or have irregularities on the reverse side thereof, which causes insufficient joining thereof due to difficulty of ensuring stable contact force upon joining, or protrusion of the shutter guide plate 5 from the cartridge main body 3, producing a problem in view of the reliability. Therefore, embossing is, ideally, of the roughness of 10 $\mu$m or less and 20% of the plate thickness.

Figure 16:
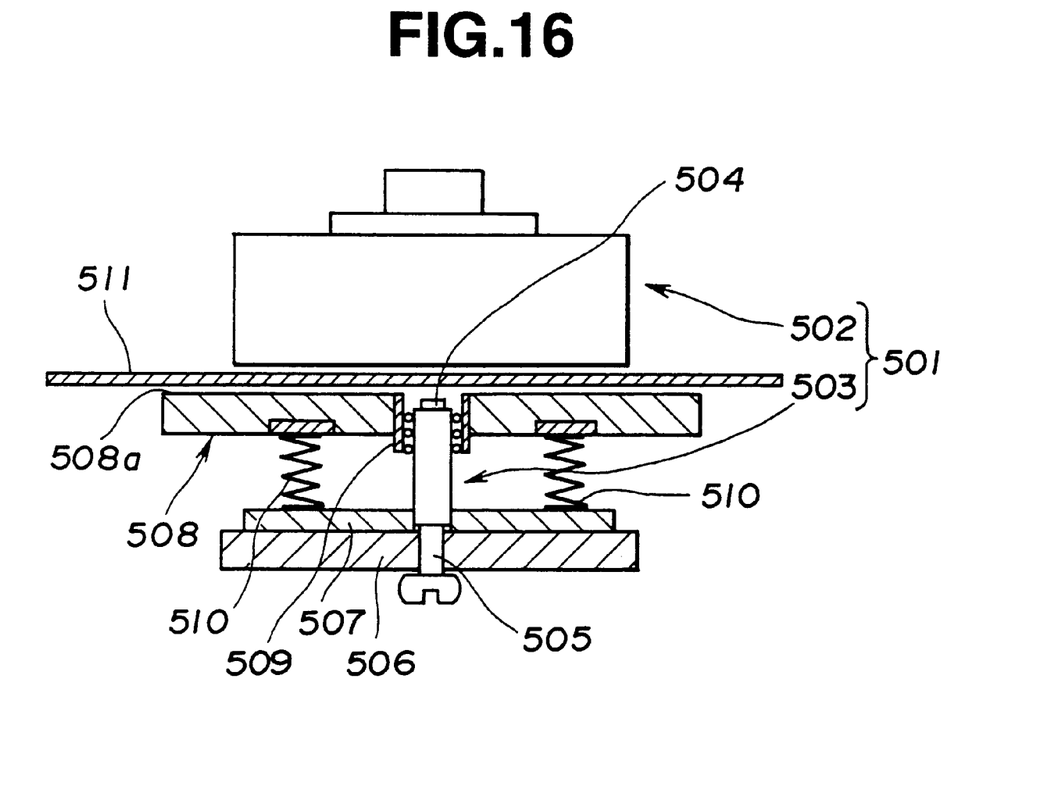
FIG. 16 is a side view, partly in section, showing a press.

FIG. 16 shows a press 501 for carrying out embossing finish. The press 501 comprises a vertically movable or upper punch 502 and a stationary or lower punch 503 disposed below the movable punch 502. The stationary punch 503 has an upper end formed with a marking chip 504, and a lower end supported by a die holder 506 and a die 507 through a screw 505 for adjusting the height of the marking chip 504. Disposed above the die 507 is a plate support table 508 comprising a punch guide 509 engaged with the upper portion of the stationary punch 503, and being supported by springs 510 arranged on the die 507 vertically movably with respect to the stationary punch 503. The plate support table 508 has a plate support surface 508a placed above the marking chip 504 to floatingly support a plate 511 with respect to the marking chip 504.

When carrying the plate 511 to a predetermined position on the plate support table 508, the movable punch 502 is moved downward to depress the plate 511 and the plate support table 508, pressing the surface of the plate 511 to the marking chip 504, obtaining a roughened or embossed surface of plate 511.

Figure 17:
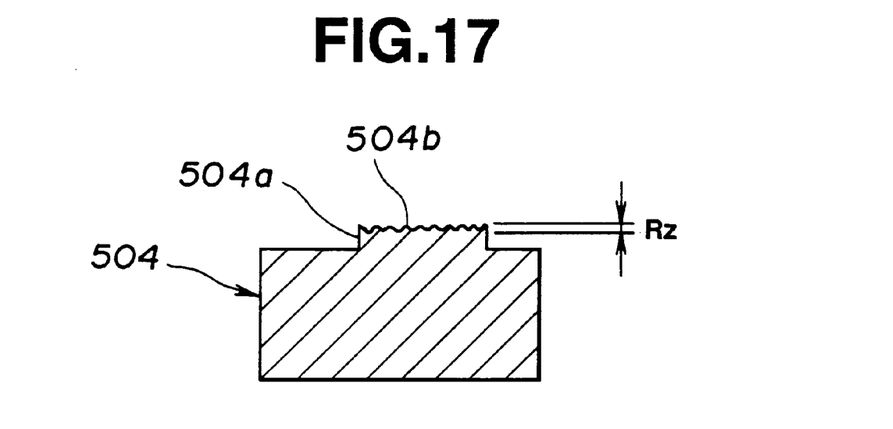
FIG. 17 is a view similar to FIG. 15B, showing a marking chip.

Referring to FIG. 17, the marking chip 504 has a marking portion 504a formed on the upper side. The upper side of the marking portion 504a includes a roughened surface 504a with embossing roughness of 20 $\mu$m or more and 30% or less of the thickness of the shutter guide plate 5. As described above, when pressing the plate 511 on the marking chip 504 by the movable punch 502, the roughened surface 504a of the marking portion 504a is transcribed on the surface of the plate 511, obtaining an embossed surface as shown in FIGS. 15A–15B.

Figure 18:
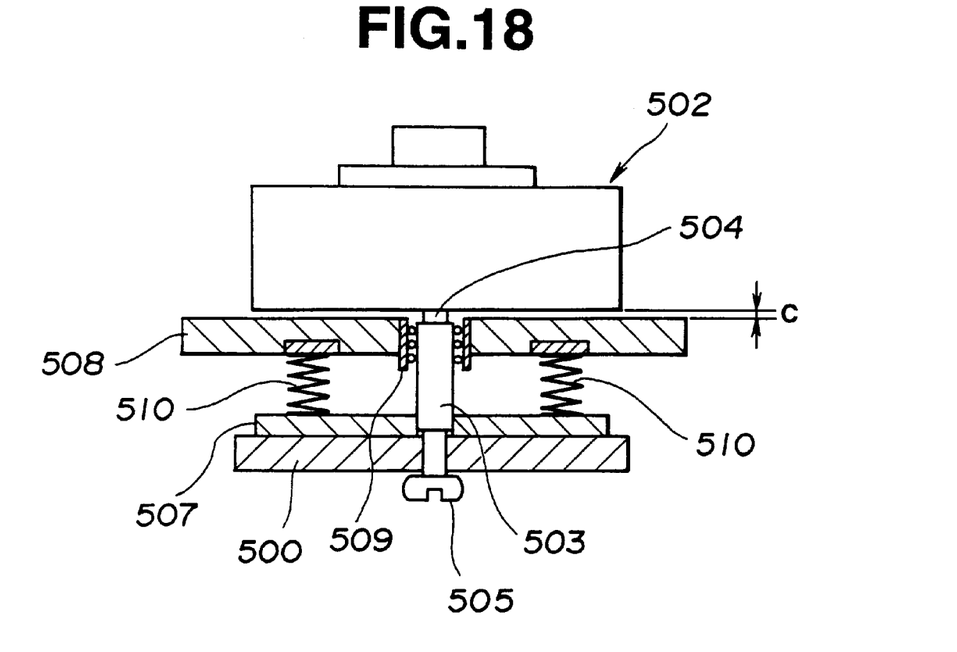
FIG. 18 is a view similar to FIG. 16, showing the press.

Referring to FIG. 18, a clearance C between the movable punch 502 at the lower dead center thereof and the marking chip 504 is determined to a value of approximately 90% of the thickness of the plate 511, i.e. approximately 0.18 mm when the thickness of the plate 511 is 0.2 mm, obtaining sufficient transcription accuracy.

In the embodiment; the roughened surface is formed on only the joining surface 5a of the shutter guide plate 5 to be joined to the shutter-guide-plate mount 6, alternatively, it may be formed on both surfaces of the shutter guide plate 5 and the shutter-guide-plate mount 6, which enables further improvement in the adhesion reliability.

What is claimed is:

1. A cartridge for a disc, comprising:
    a main body rotatably accommodating the disk, said main body including a shutter guide plate mount portion;
    a shutter slidably mounted to the main body;
    a guide plate mounted to said shutter guide plate portion of said main body, said guide plate serving to guide sliding of a pointed end of said shutter; and
    an adhesive selected from the group consisting of a two-epoxy-agent type, a solventless hot-melt type, and an ultraviolet curing type containing acrylic oligomer which is placed between said shutter guide plate mount portion of said main body and said guide plate, said adhesive being 10% or less in volume difference between melted and solidified states.

2. A cartridge as claimed in claim 1, wherein said adhesive includes a hot-melt adhesive.

3. A cartridge as claimed in claim 2, wherein said guide plate is heated before pressed on said hot-melt adhesive.

4. A cartridge as claimed in claim 1, wherein said adhesive contains a filler of inorganic material of 2–25% by weight.

5. A cartridge as claimed in claim 1, wherein said site of said main body includes a reference surface for disposing said guide plate, and a placing surface arranged lower than said reference surface for placing said adhesive.

6. A cartridge as claimed in claim 5, wherein said reference surface and said placing surface are separated by a groove.

7. A cartridge as claimed in claim 5, wherein said placing surface is concaved.

8. A cartridge as claimed in claim 5, wherein said placing surface is formed with a rib of substantially the same height as that of said reference surface.

9. A cartridge as claimed in claim 1, wherein at least one of said shutter guide plate mount portion of said main body and said guide plate has a joining surface formed in a roughened surface.

10. A cartridge for a disk, comprising:
    a main body rotatably accommodating the disk, said main body including a shutter guide plate mount portion;
    a shutter slidably mounted to the main body;
    a guide plate mounted to said shutter guide mounted portion of said main body, said guide plate serving to guide sliding of a pointed end of said shutter; and
    means for joining said guide plate to said shutter guide plate mounting portion of said main body, said joining means is formed of an adhesive selected from the group consisting of a two-epoxy-agent type, a solventless hot-melt type, and an ultraviolet curing type containing acrylic oligomer, said joining means being 10% or less in volume difference between melted and solidified states.

11. A cartridge for a disk comprising:

a main body rotatably accommodating the disk, said main body including a shutter guide plate mount portion;

a shutter slidably mounted to the main body;

a guide plate mounted to said shutter guide plate mount portion of said main body, said guide plate serving to guide sliding of a pointed end of said shutter; and an adhesive mixture placed between said shutter guide plate mount of said main body and said guide plate, said adhesive mixture being formed of a mixture of a solventless hot melt adhesive containing a filler of an inorganic material which is between approximately 3–20 $\mu$m in size and mixed in the hot melt adhesive at the rate of between 2–25% by weight, said adhesive mixture being 10% or less in volume difference between melted and solidified states.

12. The cartridge for a disk of claim 11 wherein said filler is formed of calcium carbonate.

* * * * *